United States Patent
Barazanji et al.

(10) Patent No.: US 12,531,957 B2
(45) Date of Patent: Jan. 20, 2026

(54) OBJECT DATA EXCHANGE

(71) Applicant: BSOFT GLOBAL LLC, Tampa, FL (US)

(72) Inventors: Khalid Barazanji, Enterprise, AL (US); Haitham Barazanji, Tampa, FL (US); Omar Barazanji, Enterprise, AL (US)

(73) Assignee: BSOFT GLOBAL LLC, Tampa, FL (US)

( * ) Notice: Subject to any disclaimer, the term of this patent is extended or adjusted under 35 U.S.C. 154(b) by 411 days.

(21) Appl. No.: 18/070,746

(22) Filed: Nov. 29, 2022

(65) Prior Publication Data

US 2024/0179262 A1 May 30, 2024

(51) Int. Cl.
*H04N 1/32* (2006.01)
*G06V 20/30* (2022.01)
*H04L 51/04* (2022.01)
*H04L 51/52* (2022.01)

(52) U.S. Cl.
CPC ......... *H04N 1/32149* (2013.01); *G06V 20/30* (2022.01); *H04L 51/04* (2013.01); *H04L 51/52* (2022.05); *H04N 1/32133* (2013.01); *H04N 2201/3269* (2013.01); *H04N 2201/3271* (2013.01)

(58) Field of Classification Search
None
See application file for complete search history.

(56) References Cited

U.S. PATENT DOCUMENTS

| | | | | |
|---|---|---|---|---|
| 8,331,566 | B1* | 12/2012 | Foote | H04L 67/5651 380/255 |
| 11,017,020 | B2 | 5/2021 | Desmond et al. | |
| 2011/0090529 | A1* | 4/2011 | Hertling | G06F 3/1204 358/1.15 |
| 2012/0229830 | A1* | 9/2012 | Mori | H04N 1/32149 358/1.12 |
| 2013/0222820 | A1* | 8/2013 | Nakaso | H04N 1/32101 358/1.6 |
| 2014/0188997 | A1* | 7/2014 | Schneiderman | H04L 51/52 709/204 |
| 2015/0281250 | A1* | 10/2015 | Miller | G06F 16/4393 726/1 |
| 2023/0334596 | A1* | 10/2023 | Jiang | H04L 51/046 |
| 2024/0265597 | A1* | 8/2024 | Sabbarwal | G06F 3/1208 |

OTHER PUBLICATIONS

MemoryWebLLC, MemoryWeb—Our Story, https://www.facebook.com/sharer/sharer.php?u=https://www.memoryweb.me/.
Google Play, Google Photos, https://play.google.com/store/apps/details?id=com.google.android.apps.photos.

* cited by examiner

*Primary Examiner* — Miya J Cato
(74) *Attorney, Agent, or Firm* — Mahamedi IP Law LLP

(57) ABSTRACT

A computer system is provided that includes an Object Data Exchange (ODE) processor and a memory to store a set of instructions wherein the processor accesses the instructions to allow users to select files manually or automatically, such as texts, images, videos, audios or any other electronic files, from instant messaging/smart phone/chat Apps and add them as objects to the processor. The instructions allow the instant messaging or social media platform, connected to a Matrix server to interact with the ODE App by collecting media from multiple instant messaging or social media platforms and wherein the user can add an object to the ODE App while in an instant messaging, smart phone, or social media platform.

7 Claims, 5 Drawing Sheets

OBJECT DATA EXCHANGE

BRIEF STATEMENT OF THE INVENTION

The present invention pertains to a system that allow users to add, scan, bind, sort, search, allocate, display, print information of media such as photographs and video clips, and display information of physical objects.

BACKGROUND OF THE INVENTION

Data collection, storage, and management technologies have become an essential part of current daily human norm. An important part of that is the need to add, sort, search, share, display and print information about media and things including exchanged media in instant messaging and chat platforms. There is a great need for users to be able to add their specific descriptive information to images of physical objects, photos, videos, and other media that they created or experienced in their everyday life. An object can be any physical or digital item that a user chooses to describe or attach personalized information.

Furthermore, printing photos, and images of objects is a service that is highly needed and is widely used by smart-media users (smart phones, tablets, etc.). The problem for users, however, is that with time, the stories behind these photos/images can slowly be forgotten and then can disappear forever. This unfortunate problem could result in losing the information or description of lot of joyful memories and records, that families and friends would love to otherwise have kept for them, their children, and for generations to come. In addition, the documentation of the digital photos/images is important for many other reasons, including but not limited to, archives of legal and historical records. Furthermore, data exchanged through instant messaging or social medica platforms have become hard to locate and manage in the daily massive chatting habits.

Current solutions do provide capabilities to save different media types into user's profiles and space. However, they do not provide the ability to intuitively save, sort, search and share wide range of objects including photos/images and other types of objects like videos and audios, based on their description. Furthermore, current App solutions do not provide the ability to provide and manage digital audio and video descriptions for the saved objects on the user's smart phone/tablet space. In addition, these Apps do not provide printing capability for the text description of the digital photos/images with the description printed on the back or front of the photos/images printing paper. In addition, there are no solutions that allow audio/video description to be digitally saved and attached to a photo/image or a group of photos/images. Furthermore, there are no solutions that can systematically manage media that is exchanged through instant messaging or social medica platforms.

SUMMARY OF THE INVENTION

Objects Data Exchange (ODE) is a technology solution which allows users to save, allocate, sort, search, share, display, and print objects' data information, using a highly secured process. The Data can be any information that a user chooses to bind to objects, and can be in the form of texts, audio, and/or video format. An ODE object is any physical or digital item that a user chooses to describe or attach information in order to personalize the interactive experience for friends, family, colleagues and business associates. Object's information is identified by a unique visible/invisible Code Key Identifier (CKI) that can be embedded into the object or through an object recognition process.

The ODE technology allows users to store information and bind it to any object, and have it played, displayed, printed, and shared with other users. It provides the ability for any object to have a digital format information attached, that can help identify and educate users about the object.

The ODE will provide the user a simple and intuitive digital solution to be able to add, save, sort, search, display, share and print descriptive information of the user's digital photos/images and other objects, including exchanged media in instant messaging or social media platforms. The ODE offers the user an option to print object information on the back, and the front sides of printed photo/image paper. This information can also be displayed along with or next to the photo being viewed on any smart device or an app-enabled media.

The information may contain date, place, names of people, and description of the digital photo/image, or any other notes. The description information can be saved in the form of written text or in the form of digital audio, visual images, or video clips. In addition, ODE provides users the ability to search, sort, save, and allocate photos based on dates, keywords (people's names, locations, relationships, etc.), phrases and many other search and sort criteria.

An ODE object is identified by a randomly assigned CKI, which is unique for each object. The ODE allows existing code identifiers programs to retrieve the CKI. The following are some examples of existing code Identifiers that can be used by ODE to authenticate the CKI: geo location, computer vision, audio recognition, or an invisible QR code containing the CKI. Upon authentication, the ODE object information becomes accessible to the ODE user.

The ODE will have access to incoming and outgoing messages of most instant messaging and social media platforms. There are frameworks, such as Matrix, that allow a programming interface to interact with messaging platforms. The Matrix framework can run on a server, set to save data from most instant messaging or social media platforms on the user's device. The ODE App can then display and manage all the user's messaging media in a user-friendly listing format, based on various criteria. For example, if a user is messaging someone named Jane Doe, the ODE App can group and manage all media, links, or other files exchanged with Jane from the instant messaging apps. The user can then sort and save media to create objects within ODE. Every ODE object or group of objects can be shared publicly or privately. The user also can create a website for their ODE profile to share with friends, family, or other users, including non-ODE users. The user can subscribe to a domain name for their media as a subscription service for sharing their objects seamlessly through a web http link.

ODE sharing feature allows ODE users to share objects and their descriptions with other ODE and non-ODE users. When shared with ODE users, these users can edit, save, and search the shared objects with permissions. When shared with non-ODE users, the shared objects will be displayed as an image with the option to subscribe to ODE to view, edit, save, and search these objects. In addition, once subscribed to ODE, users can also share these objects with other users. ODE users can share their objects with selected or all individuals in their contact list, or any members of instant messaging and social media platforms, with three possible levels of access control/privileges:

1. Private (only accessible to primary user)
2. Read only for other users
3. Read and edit for other users.

In an embodiment, the invention provides a computer system that includes an Object Data Exchange (ODE) processor and a memory to store a set of instructions wherein the processor accesses the instructions to allow users to select files manually or automatically, such as texts, images, videos, audios or any other electronic files, from instant messaging/chat Apps and add them as Objects to the processor. The instructions allow the instant messaging or social media platform, connected to a Matrix server to interact with the ODE App by collecting media from multiple instant messaging or social media platforms and wherein the user can add an object to the ODE App while in an instant messaging or social media platform.

DETAILED DESCRIPTION OF THE INVENTION

Figure 1:
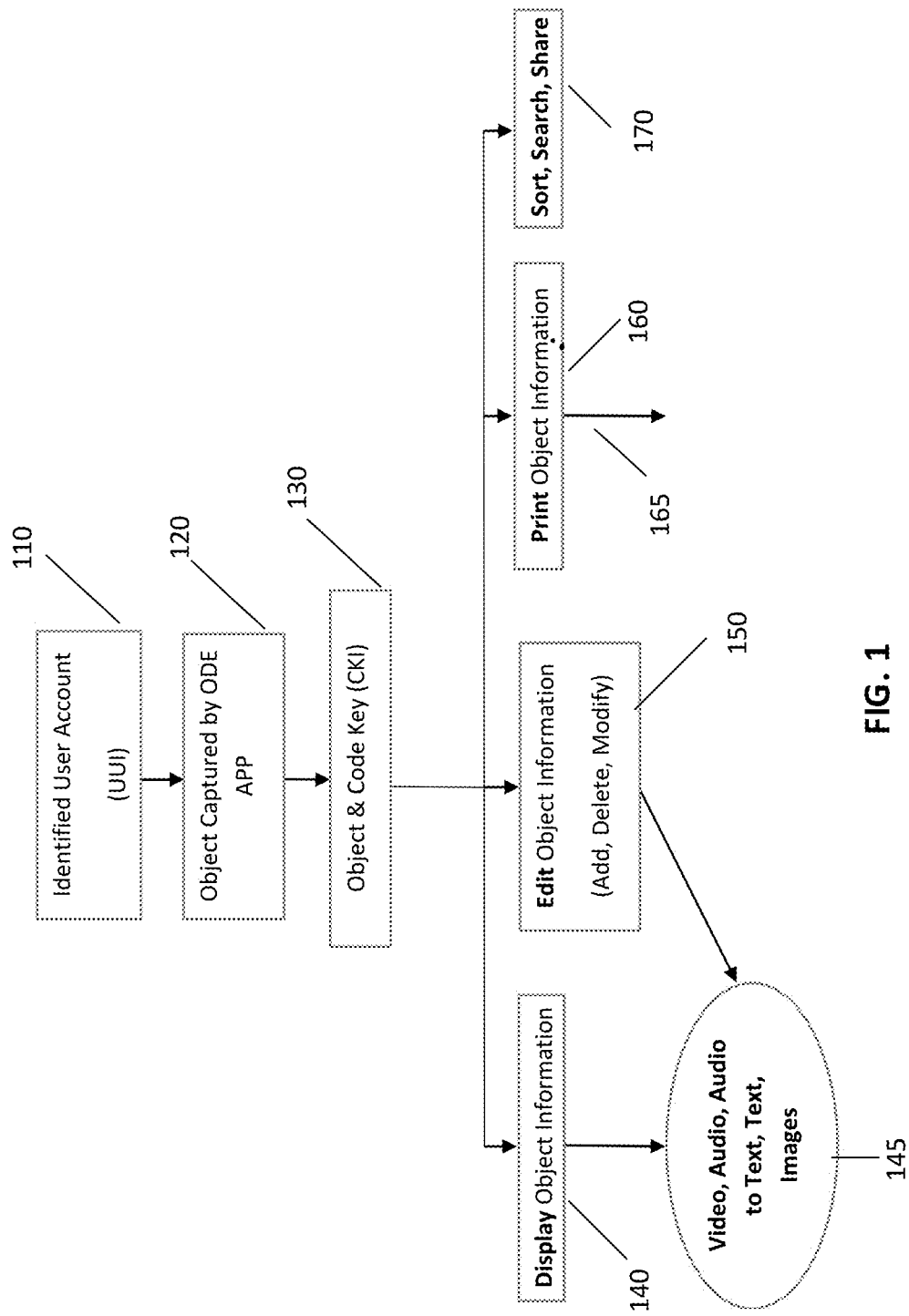
FIG. 1 is a flow diagram depicting the processing of a detected object.

An embodiment of the invention is described with reference to FIGS. 1-5. Turning to FIG. 1 the ODE system is described. Every ODE system ("App") user is assigned a User Unique Identifier (UUI) 110 at the time of signing up for the ODE App. When a user login to the ODE App, the App verifies their username and password. The ODE App authenticates the user information through basic password verification, facial recognition, and/or fingerprint authentication techniques.

In this case, an object is a physical object, a printed image or a file. The user hovers over the physical object, printed image or file, for the ODE App to capture the image of the object and verify 120.

Once an object image is captured, the ODE App attempts to identify the image to determine if that object has an assigned CKI within the ODE App user space 130.

Once identified by the ODE App, object's information can be displayed by the user on their smart device screen 140. The displayed object information identified by CKI and previously linked to the object can be in the form of text, audio, video or image 145.

Once identified by the ODE App, object's information can be added, deleted, or modified by the user 150. The edited information can be updated for later reference by the user using the ODE App.

Once identified by the ODE App, object's text information 165 can be printed by the user using the ODE App along with the identified or selected image 160. The printing can be on the back and the front of the image or photo. In the case of the photo print, printing on the back of a photo paper.

Once identified by the ODE App, object's information can be sorted in the ODE user's space using different sorting criteria 170. In addition, the user can search for existing objects and object's information using keywords and searching patterns. Furthermore, a user can share the object image and information with other users. The ODE App sharing feature will make use of the NFC, Bluetooth, or HTTP webapp to seamlessly deliver content to any device regardless of whether the user (who the information or objects are shared with) has the ODE App or not. This is possible because all modern consumer operating systems (Android, IOS, Mac, Window) can render website/HTTP. The ODE App can take user's tagged information and the media itself and create a temporary link to the content. The use of NFC and Bluetooth can deliver this webapp to the user offline, along with their content information. If the user is trying to send a large file, they can still share the content and replace the media with a link to a third-party storage (Drive, Dropbox, etc.) and the webapp will still deliver the content.

Figure 2:
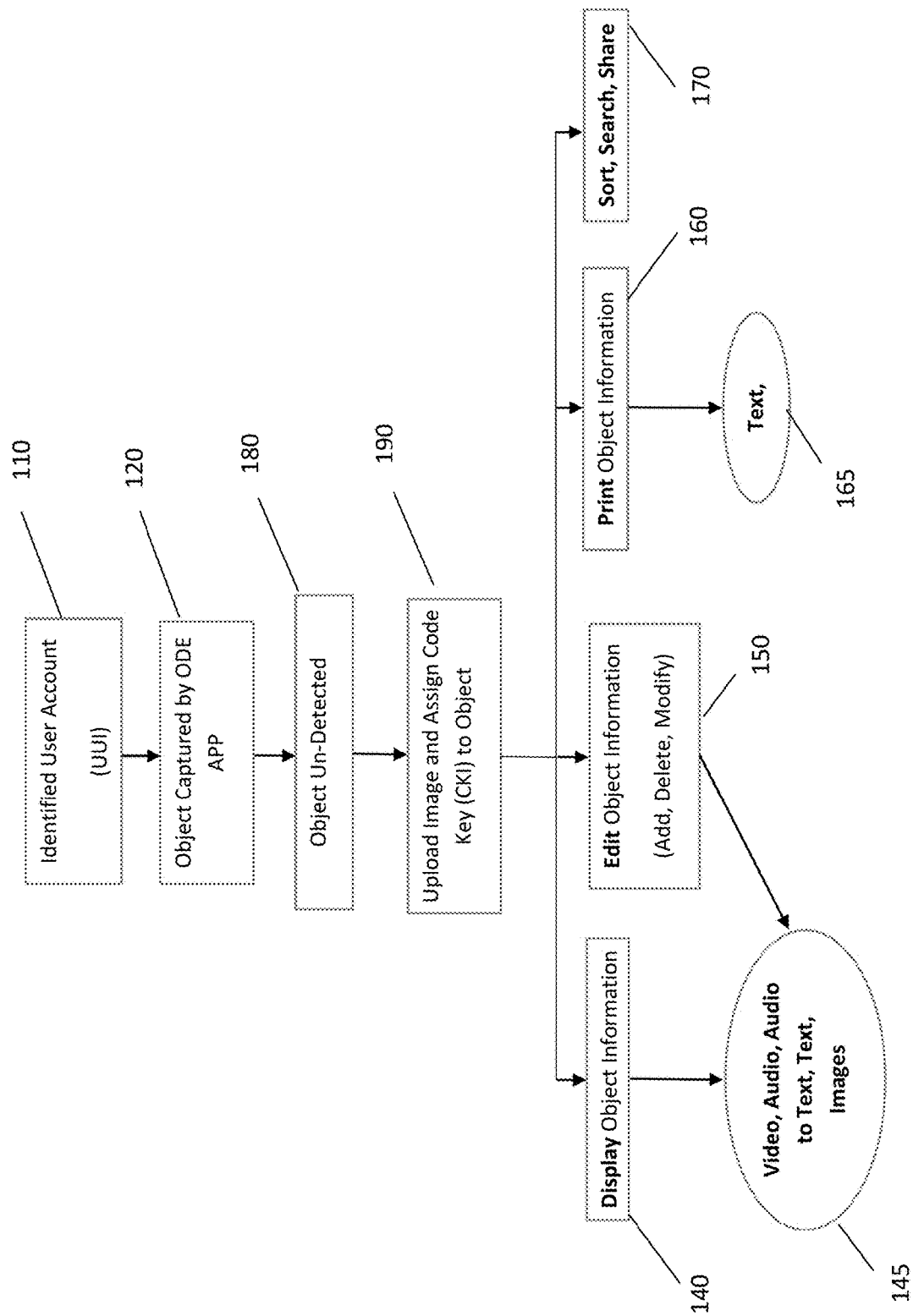
FIG. 2 is a flow diagram depicting the processing of an un-detected object.

Turning to FIG. 2, when a captured image of a physical object is not identified by the ODE App, the image is considered new 180. The user will have the option to add the new image to the user's ODE App space.

Once determined that the object image is not part of the user's ODE space, the ODE App assigns a CKI to the image and adds it to the user's space for future reference 190. Once added, ODE user can sort, search, add, edit and share information linked to it 170.

ODE user has the option to create a digital object by taking a digital image, recording a video using user's smart device camera, recording an audio file using the user's smart device microphone, or writing text through the ODE App. Once created, the object is automatically added to the user's ODE space. Once added, ODE user can sort, search, add, edit and share information linked to the object 170.

Figure 3:
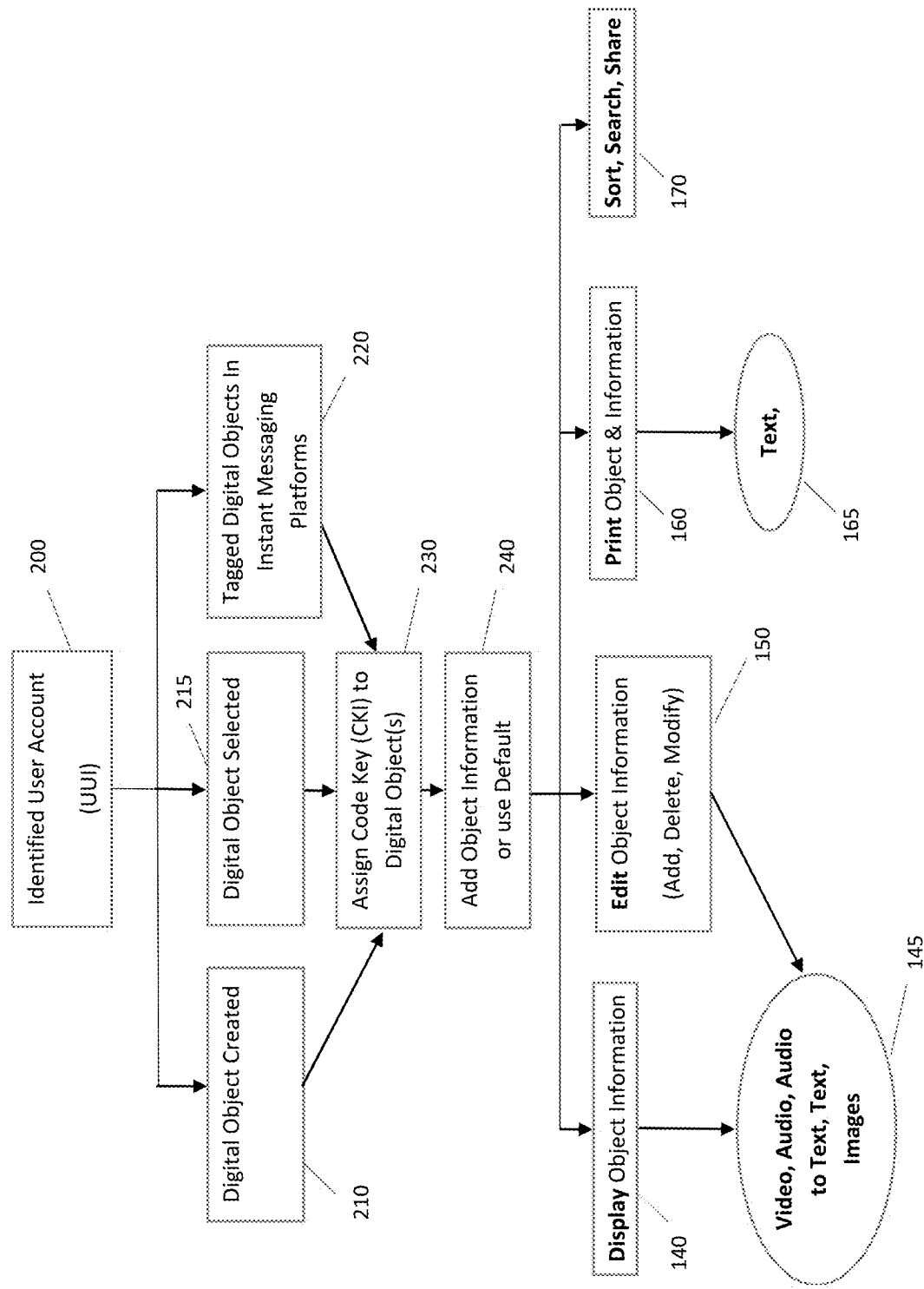
FIG. 3 is a flow diagram depicting the processing of digital objects in social media app.

Turning to FIG. 3, Digital objects in the form of images, videos, audios, and text that are already created 210 and exist in the user's smart device or space, can be selected by the user through the ODE App 215. Once selected, ODE user can sort, search, add, edit and share information linked to it 200.

The ODE App can tag files, images, videos, and audios communicated on social media 220 (e.g. WhatsApp groups) and chats and gives the ODE user the ability to sort, search, add, edit and share information linked to it. Once adopted by the ODE App, an ODE user can easily find any digital media such as photos, videos, files or text, conversations, or chat groups (that are used in most instant messaging platforms such as WhatsApp), by simply using a search pattern to look up the object.

Once created or selected, digital objects are assigned a CKI. Once assigned, ODE user can sort, search, add, edit and share information linked to it 230.

Once created or selected, ODE user is given the choice to either add information to the object or let the ODE App use the default description 240. Information added or linked to an object can be in the form of images, video, audio, text, and audio to text 145.

Figure 4:
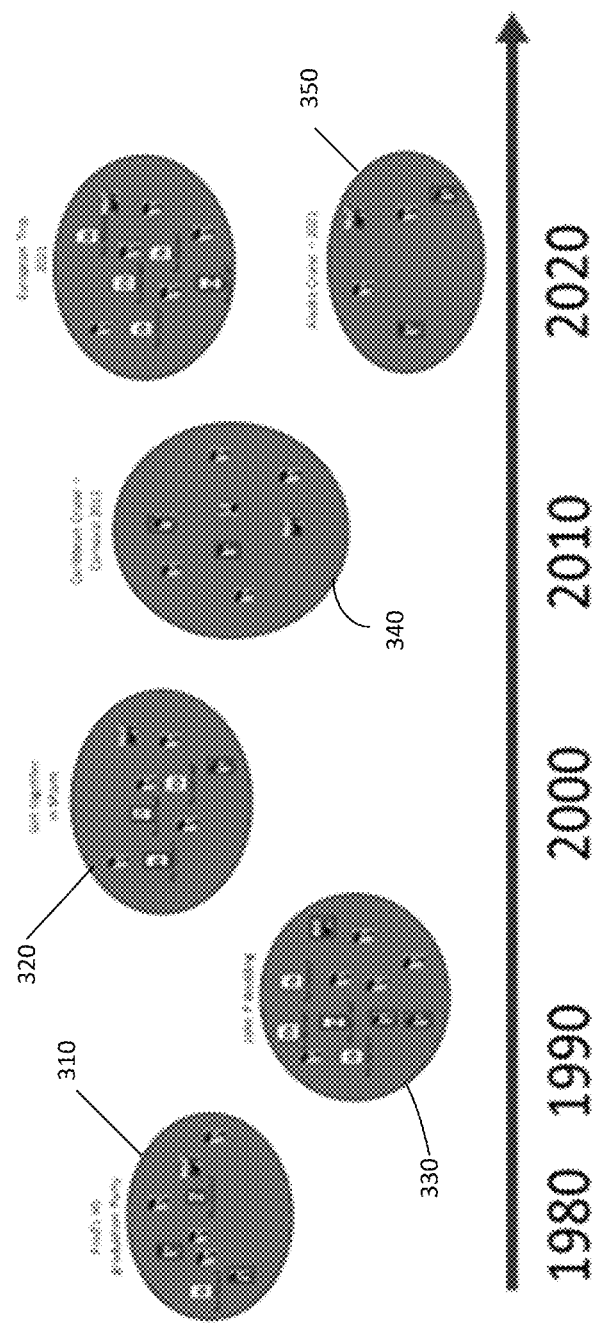
FIG. 4 is a screen shot of a sample depiction of particular object files.

ODE will display objects as clustered ovals organized as shown in the FIG. 4. In this example, each oval represents an event, such as a graduation party 310, a business trip get together 320, a wedding 330, a cruise 340, etc. Each event (i.e., oval) contains images of the objects organized/assigned by the user to that event. When a user searches for specific objects based on a search criterion (e.g. person' name, date, geo location 350, or a key word), the graphical presentation will illuminate those specific objects. In the example below, the search of a name resulted in objects with red frames for all the objects that contain the search criterion of the name. The user can then expand each cluster/event to view the details of that event. The user has the option to unhighlight (deselect) objects or highlight more objects for the purpose of saving and/or sharing the highlighted objects as a new group.

Figure 5:
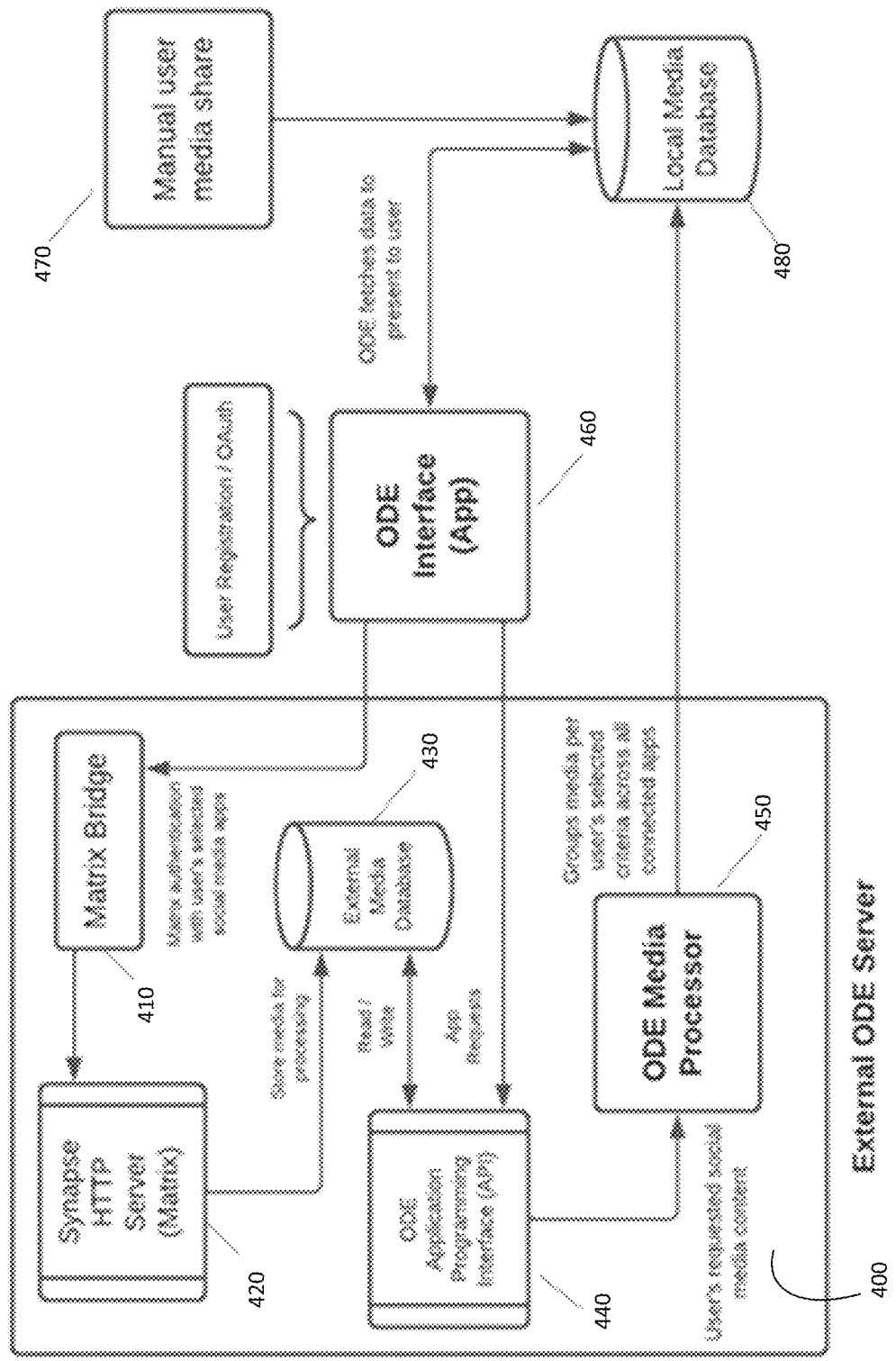
FIG. 5 is a block diagram of an External ODE Server.

Turning to FIG. 5, the ODE App will have access to incoming and outgoing messages of most instant messaging and chatting services (e.g. IM). There are frameworks, such as Matrix Bridge 410, that allow a programming interface to interact with messaging services. The Matrix framework can run on a server 400, set to save data from all messaging platforms on the user's device. The ODE App can then display all the user's messaging media in an organized list of clusters, where the clusters represent the people that the user messages. For example, if ODE recognizes that you are messaging someone named Jane Doe, it will group all media, links, or any other files exchanged from all chat apps with Jane. The user can then sort and save media to create objects within ODE. Every object or group of objects can be shared publicly or privately. While inside non-ODE messaging platforms, the ODE user can select an object and add it to ODE. The user can also create a website for their ODE profile to share with friends, family, or other users, including users without ODE. The user can rent a domain name for their media through ODE as a subscription service for sharing their objects seamlessly through a http web link. The user can create a webapp, or a sharable version of the ODE app that can be accessed by others who go to the link, with different access privileges, set by the user (e.g. edit or read-only). The user can customize their website to show any object or a group of objects and any of the user's content they wish to share. The same domain can be used to share objects. If the user wishes to make an ODE object accessible to another user or public, they can configure this in the ODE App. Given an object, the user can make the object public or accessible to anyone with a generated link, share the object with other ODE users by username or email, or make the Object private or only accessible by the user. The webapp can allow for seamless content delivery from one device to another, regardless of the operating system (e.g. IOS to Android). Following is a diagram describing the ODE Social Media functionality.

The Synapse HTTP Server 420 or Matrix Server will be running externally and will use the open-source implementation of the Matrix protocol, Synapse, to collect data from any connected instant messaging or social media platform authorized by the user.

The ODE Interface 460 is an application (App) running on a smartphone or any other computing device, such as a Mac or PC. The ODE App 460 is responsible for registering users and handling authentication. The ODE App send requests to the Matrix server to retrieve social media data based on user's search criteria and authorized social media Apps.

The external media database 430 holds data from the Matrix Server. The App can receive media from the external media database by user request.

The ODE App Programming Interface (API) 440 is a service that allows the app or user to interact with their data from Matrix 410 and view, delete, modify, search, or run any other operations that require cloud computation, such as using a large computer vision model to group user's photos and videos by facial identity, location, scenes, or any other image and video classifier. The API 440 will contain a fixed set of operations to allow the ODE App 460 the ability to fetch and display content from social media apps.

The ODE Media Processor 450 extracts and converts data retrieved from the Matrix Server 420 and loads the data into the local media database running on the user's device.

The Matrix Bridge 410 refers to ODE user-authorized access to Matrix server with user's selected instant messaging and social media platforms. Any instant messaging or social media platform connected to Matrix is referred to as a "bridge". Bridges are implemented by the Matrix open-source community, and they contain a server to collect data from most of, if not all, instant messaging and social media platforms.

The External ODE Server 400 can take requests and respond to the ODE App 460 with user data. The server can run continuously and can be hosted on a cloud-based provider, such as Amazon Web Services (AWS).

The Local Media Database 480 exists on the user's device and can access the External ODE Database 430 from the Matrix Server via the ODE API, which is hosted on the External ODE Server 400. Data from the External ODE Database 430 can be sent to the user's local storage by the user's request. The ODE App allows the user to display all content from the Local Media Database 480.

ODE users can select and export media from their instant messaging or social media platforms directly to the Local Media Database by manually sharing media 470 to the ODE App 460.

The following is a summary of the features that the ODE App will provide: The ability to print (text) description information to the back and/or the front sides of the printed digital photo/image paper. The ability to embed a code identifier (visible or invisible) to the back and/or front of the printed photo/image, for the purpose of playing or displaying description information on a smart device or computer. Description information can be text, audio or video files. The ability to save, allocate, search, share, sort, play or display description information for digital photos/images. Description information can be text, audio or video files. Searching and allocating capability using keywords such as dates, names, locations, key words, and phrases. Interfacing with social media platforms and with existing digital photos/images solutions. Back-end access for licensed partners/users, that provides statistics, data, and reports. Ability to select and save functions via Matrix is unique and emphasized.

The ODE App can expand on the current digital photo/image solutions by enhancing the printing feature to include the description information for these digital photo/image. The ODE App can tag files, images, videos, and audios communicated on WhatsApp and other chat platforms and gives the ODE user the ability to sort, search, add, edit and share information linked to it. In addition, the ODE App provides users the ability to print text description information on the back or front of the photo/image printing paper. Furthermore, the ODE App provides the ability to embed a code identifier to the back or front of the printed photo/image, for the purpose of playing or displaying description information on a smart device or computer. Description information can be text, audio or video files.

FIG. 5 is a block diagram that illustrates a computer system upon which embodiments described herein may be implemented. A computer system can be implemented on, for example, a server or combination of servers 400. For example, the computer system may be implemented as part of a network service for providing transport services. In the context of FIG. 1, some or all of the functionality described with an ODE system may be implemented using computer system and server 400. Likewise, a method such as described with an example of FIG. 2 may also be implemented using computer system and server 400.

In one implementation, the computer system and server include processing resources, memory resources (e.g., read-only memory (ROM) or random access memory (RAM)), databases 430 and 480, and a communication interface 460.

The computer system includes at least one processor 450 to process information (including storing temporary variables) and execute instructions stored in the memory resources. The computer system may also include additional storage devices for storing static information and instructions for the processor 450. A storage device 430, such as a magnetic disk or optical disk, is shown for storing information and instructions.

The communication interface 460 enables the computer system to communicate with one or more client devices, over one or more networks (e.g., cellular network) through use of the network link (wireless or a wire). In particular, the computer system may use memory resources to store executable instructions that can be executed on the computer system to configure browsers and/or browser-enabled applications of respective client devices, in order to implement functionality such as described with an ODE server 400 of an example of FIG. 1. As an addition or variation, the computer system may transfer scripts, browser logic, plugins or other instructions to client computers in order to enable a distributed computing platform on which page rendering functionality such as described with an example of FIG. 1 may be provided.

Examples described herein are related to the use of the computer system for implementing the techniques described herein. According to an aspect, techniques are performed by the computer system in response to the processor 450 executing one or more sequences of one or more instructions contained in the memory resources. Such instructions may be read into the memory resources from another machine-readable medium, such as the storage device. Execution of the sequences of instructions contained in the memory resources may cause the processor 450 to perform the process steps described herein. In alternative implementations, hard-wired circuitry may be used in place of or in combination with software instructions to implement examples described herein. Thus, the examples described are not limited to any specific combination of hardware circuitry and software.

Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

The invention claimed is:

1. A computer system comprising:
an Object Data Exchange (ODE) processor; and
a memory to store a set of instructions wherein the ODE processor accesses the instructions to:
allow users to select files manually or automatically, such as texts, images, videos, audios or any other electronic files, from instant messaging/chat Apps and capture them as objects to the processor;
wherein the instant messaging or social media platform, connected to a Matrix server, interacts with an ODE App by collecting media from multiple instant messaging or social media platforms;
wherein the user can add an object to the ODE App while in an instant messaging or social media platform;
wherein the ODE processor allows users to:
manually select files, such as texts, images, videos, audios or any other files that are electronically saved on user's smart device and add them as objects to the ODE processor;
scan physical objects including printed texts, images, video links, and audio links as objects to ODE;
analyze a captured object to assign a unique tagging Code Key Identifier (CKI) to be referenced within ODE;
embed a tagging code to a front or back of a printed version of the object;
add or edit description to the object(s);
print description (text only) on the back of printed objects (photos and images only);
search and group/sort objects and their description based on search criteria such as name, date, location, and other key words;
display searched objects in a chronological graphically-clustered presentation;
save and share objects or group of objects with both ODE and non-ODE users;
scan a tagging code (CKI) by hovering over the printed object using a smartphone to view, save, edit, and share the object and its description virtually; and
share ODE objects with all or selected individuals in their contact list or any members of instant messaging and social media platform.

2. The computer system of claim 1, wherein three levels of access control/privileges are provided:
a) Private (only accessible to primary user)
b) Read only for other users; and
c) Read and edit for other users.

3. The computer system of claim 2 wherein one or more of the collected media are added to the ODE App based on user's search criteria.

4. The computer system of claim 1 wherein the ODE App presents, organizes and displays the objects in a personalized web page that could be accessed by other users.

5. The computer system of claim 4 wherein the object is any instant messaging/chat exchanged file, such as photo, audio, video, PDF, Word document, etc.

6. The computer system of claim 4 wherein the object is displayed on a computer device, smartphone, or monitor and can be shared to anyone with an http link.

7. The computer system of claim 1 wherein the ODE user can operate the ODE App with own voice using Artificial Intelligence (AI) Conversation Technology.

* * * * *